(12) United States Patent
James et al.

(10) Patent No.: US 8,266,680 B2
(45) Date of Patent: Sep. 11, 2012

(54) PREDICTIVE HTTP AUTHENTICATION MODE NEGOTIATION

(75) Inventors: Rick James, Redmond, WA (US); Jonathan Silvera, Seattle, WA (US); Matthew Cox, Kirkland, WA (US); Paul J. Leach, Seattle, WA (US); Anil K. Ruia, Issaquah, WA (US); Anish V. Desai, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 624 days.

(21) Appl. No.: 12/415,790

(22) Filed: Mar. 31, 2009

(65) Prior Publication Data

US 2010/0251338 A1 Sep. 30, 2010

(51) Int. Cl.
*H04L 29/06* (2006.01)
*G06F 7/04* (2006.01)

(52) U.S. Cl. ............ 726/4; 726/3; 709/229; 709/203; 713/168; 713/169; 713/170; 713/160; 713/161

(58) Field of Classification Search .............. None
See application file for complete search history.

(56) References Cited

U.S. PATENT DOCUMENTS

| | | | |
|---|---|---|---|
| 6,216,101 B1 | 4/2001 | Butts et al. | |
| 6,961,772 B1 | 11/2005 | Wensel | |
| 7,191,467 B1 | 3/2007 | Dujari et al. | |
| 7,194,763 B2 | 3/2007 | Potter | |
| 7,243,370 B2 * | 7/2007 | Bobde et al. | 726/10 |
| 7,281,139 B2 | 10/2007 | Stewart | |
| 7,398,546 B2 | 7/2008 | Chen | |
| 7,421,503 B1 | 9/2008 | Sieglitz | |
| 2003/0226036 A1 | 12/2003 | Bivens et al. | |
| 2004/0128506 A1 | 7/2004 | Blakley, III et al. | |
| 2006/0021004 A1 * | 1/2006 | Moran et al. | 726/2 |
| 2006/0185021 A1 | 8/2006 | Dujari et al. | |
| 2007/0143834 A1 | 6/2007 | Leinonen et al. | |
| 2008/0301784 A1 | 12/2008 | Zhu et al. | |
| 2009/0106433 A1 * | 4/2009 | Knouse et al. | 709/229 |

OTHER PUBLICATIONS

"Authentication with Multiple Known Headers," accessed at http://msdn.microsoft.com/en-us/library/aa814328(VS.85).aspx; on Jan. 2, 2009, pp. 1-2.
"HTTP Authentication with PHP & htpasswd," accessed at http://koivi.com/php-http-auth/; on Jan. 2, 2009, pp. 1-2.
"HttpWebRequest and Authentication—Part 1," © 2008, accessed at http://blogs.msdn.com/joncole/archive/2005/11/09/491009.aspx, on Jan. 2, 2009, pp. 1-2.
"SPNEGO-Based Kerberos and NTLM HTTP Authentication in Microsoft Windows," accessed at http://community.roxen.com/develpers/idocs/rfc/rfc4559.html, on Jan. 2, 2009, pp. 1-5.
"Using HTTP Authentication with PHP," accessed at http://programmerassist.com/article/321, on Jan. 2, 2009, pp. 1-3.

(Continued)

*Primary Examiner* — Fikremariam A Yalew
(74) *Attorney, Agent, or Firm* — Merchant & Gould, P.C.

(57) ABSTRACT

A client system and a server system use a Hypertext Transfer Protocol (HTTP) authentication mode preference header to negotiate an HTTP authentication mode. The client system sends an HTTP request to the server system. In response to the HTTP request, the server system sends an HTTP response to the client system. The HTTP response includes an HTTP authentication mode preference header. The HTTP authentication mode preference header indicates whether a preferred HTTP authentication mode is connection-based HTTP authentication or request-based HTTP authentication. In subsequent HTTP requests to the server system, the client system uses the HTTP authentication mode indicated by the HTTP authentication mode preference header.

17 Claims, 7 Drawing Sheets

OTHER PUBLICATIONS

Atif Aziz and Scott Michell, "Supporting HTTP Authentication and Forms Authentication in a single ASP. NET Web Site"; Apr. 2006, retrieved date Oct. 20, 2011, pp. 1-22.

Eric Glass, "The NTLM Authentication Protocol and Security Support Provider," SourceForge.Net, eric.glass@gmail.com, Copyright © 2003, 2006 Eric Glass, http://davenport.sourceforge.net/ntlm.html, 127 pages.

J. Franks, HTTP Authentication: Basic and Digest Access Authentication RFC 2617; Jun. 1999; retrieved date Oct. 20, 2011, 32 pages.

D. Cotroneo, A. Mazzeo, L. Romano, S. Russo, "Integration of Legacy Client-Server Applications in a Secure Multi-Tier Architecture," Proceedings of the 10th Euromicro Workshop on Parallel, Distributed and Networkbased Processing (EUROMICRO-PDP '02), http://ieeexplore.ieee.org/stamp/stamp.jsp?arnumber=00994289, 8 pages.

Yasuhiko Matsunaga, Ana Sanz Merino, Takashi Suzuki, and Randy Katz, "Secure Authentication System for Public WLAN Roaming," WMASH '03, Sep. 19, 2003, San Diego, California, USA. Copyright 2003 ACM 1-58113-768-0/03/0009, http://sahara.cs.berkeley.edu/papers/PWANAUTH.pdf, 10 pages.

MS-N2HT, Negotiate and Nego2 HTTP Authentication Protocol, copyright © 2009 Microsoft Corporation, Jan. 14, 2009, 14 pages.

MS-N2HT, Negotiate and Nego2 HTTP Authentication Protocol, copyright © 2009 Microsoft Corporation, Feb. 23, 2009, 14 pages.

MS-SPNG, Simple and Protected Generic Security Service Application Program Interface Negotiation Mechanism (SPNEGO) Protocol Extensions, copyright © 2009 Microsoft Corporation, 23 pages.

U.S. Appl. No. 12/415,817, Non-Final Office Action mailed Nov. 7, 2011, 31 pages.

U.S. Appl. No. 12/415,817, Amendment & Response to Non-Final Office Action dated Feb. 7, 2012, 12 pages.

U.S. Appl. No. 12/415,817, Final Office Action dated Mar. 14, 2012, 11 pgs.

* cited by examiner

PREDICTIVE HTTP AUTHENTICATION MODE NEGOTIATION

BACKGROUND

The Hypertext Transfer Protocol (HTTP) is one of the most important communications protocols in today's Internet. For example, HTTP is used to retrieve web pages and other data on the World Wide Web. There are two commonly used HTTP authentication modes. These HTTP authentication modes are connection-based authentication and request-based authentication.

When connection-based HTTP authentication is used, a client system sends a first HTTP request to a server system. The client system sends the first HTTP request to the server system using a Transmission Control Protocol (TCP) connection. The first HTTP request requests a resource, the resource being provided by the server system. If HTTP authentication is required, the server system uses the TCP connection to send a first HTTP rejection response back to the client system. The first HTTP rejection response indicates that the client system is not authorized to access the resource. In response to the HTTP rejection response, the client system generates an authorization header. The client system then generates a second HTTP request that requests a resource, the resource being provided by the server system. The second HTTP request includes an HTTP header that specifies the authorization header. After generating the second HTTP request, the client system uses the TCP connection to send the second HTTP request to the server system. Upon receiving the second HTTP request, the server system uses the authorization header in the second HTTP request to perform an authentication process. An authentication process is sequence of actions performed to authenticate a client system to a server system. If the authentication process is successful, the server system considers the TCP connection to be an authenticated connection. Furthermore, if the authentication process is successful, the server system sends a second HTTP response back to the client system. The second HTTP response contains the resource requested by the second HTTP request. The server system assumes that all subsequent HTTP requests received on the TCP connection are authentically from the client system. Consequently, when connection-based HTTP authentication is used, there is no need for the client system to include authorization headers in subsequent HTTP requests sent to the server system using the TCP connection.

When request-based HTTP authentication is used, a client system sends a first HTTP request to a server system. The client system may use a TCP connection to send the first HTTP request to the server system. The first HTTP request requests a resource, the resource being provided by the server system. If HTTP authentication is required, the server system uses the TCP connection to send a first HTTP rejection response back to the client system. The first HTTP rejection response indicates that the client system is not authorized to access the resource. In response to the HTTP rejection response, the client system generates an authorization header. The client system then generates a second HTTP request and uses the TCP connection to send the second HTTP request to the server system. The second HTTP request requests a resource, the resource being provided by the server system. The second HTTP request includes an HTTP header that specifies the authorization header. Upon receiving the second HTTP request, the server system performs an authentication process. If the authentication process is successful, the server system sends a second HTTP response back to the client system. The second HTTP response contains the resource requested by the second HTTP request. However, the server system does not assume that all subsequent HTTP requests on the TCP connection are authentically from the client system. Consequently, when request-based HTTP authentication is used, the client system must include an authorization header in each HTTP request sent to the server system on the TCP connection.

By default, many client systems are configured to use connection-based HTTP authentication. Such client systems send HTTP requests with authorization headers only when such client systems receive HTTP rejection responses. As mentioned above, when a server system is configured to use request-based HTTP authentication, the server system provides an HTTP response containing a requested resource only in response to an HTTP request containing an authorization header. Consequently, whenever the server system receives an HTTP request without an authorization header, the server system sends back an HTTP rejection response. As a result, whenever a client system configured to use connection-based HTTP authentication sends HTTP requests to a server system configured to use request-based HTTP authentication, the client system effectively sends two HTTP requests to the server system: a first HTTP request without an authorization header and a second HTTP request with an authorization header.

SUMMARY

A client system and a server system use a Hypertext Transfer Protocol (HTTP) authentication mode preference header to negotiate an HTTP authentication mode. The client system sends an HTTP request to the server system. In response to the HTTP request, the server system sends an HTTP response to the client system. The HTTP response includes an HTTP authentication mode preference header. The HTTP authentication mode preference header indicates whether a preferred HTTP authentication mode is connection-based HTTP authentication or request-based HTTP authentication. In subsequent HTTP requests to the server system, the client system uses the HTTP authentication mode indicated by the HTTP authentication mode preference header.

This summary is provided to introduce a selection of concepts in a simplified form. These concepts are further described below in the Detailed Description. This summary is not intended to identify key features or essential features of the claimed subject matter, nor is this summary intended as an aid in determining the scope of the claimed subject matter.

DETAILED DESCRIPTION

As briefly described above, a client system and a server system use a Hypertext Transfer Protocol (HTTP) authentication mode preference header to negotiate an HTTP authentication mode. This disclosure references a set of figures. The figures are included for explanatory purposes only and are not intended to limit the scope of the claimed subject matter.

Figure 1:
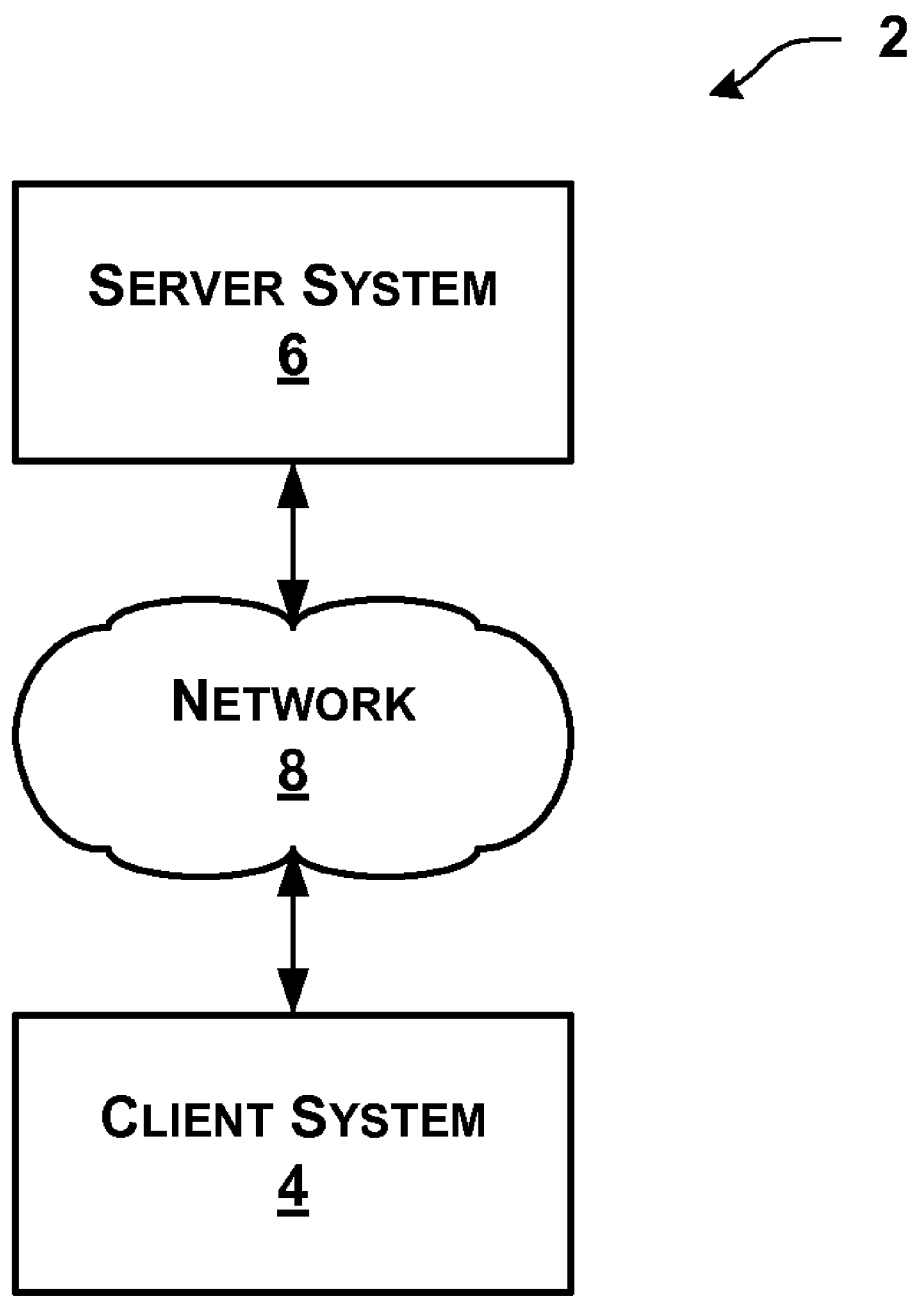
FIG. 1 is a block diagram illustrating an example system implementing the techniques of this disclosure.

FIG. 1 is a block diagram illustrating an example system 2 implementing the techniques of this disclosure. It is to be understood that system 2 is merely one example. The techniques of this disclosure may be implemented in many other ways. For instance, other systems implementing the techniques of this disclosure may include more or fewer components, systems, connections, and so on.

As illustrated in the example of FIG. 1, system 2 includes a client system 4. Client system 4 is an electronic computing system. As used in this disclosure, an electronic computing system is a set of one or more electronic computing devices. This disclosure describes details of an example electronic computing device with reference to FIG. 7. Client system 4 may include a wide variety of different types of electronic computing devices. For example, client system 4 may include a personal computer, a mobile telephone, a personal digital assistant (PDA), a digital media player, a television set top box, a television, a home appliance, an industrial appliance, a device integrated into a vehicle, a video game console, an Internet kiosk, a netbook, a laptop computer, a handheld video game device, an intermediate network device, a standalone server device, a server blade device, a network storage device, an Automated Teller Machine, a wearable computing device, or another type of electronic computing device.

In addition to client system 4, system 2 includes a server system 6. Server system 6 is an electronic computing system. Like client system 4, server system 6 may include a wide variety of different types of electronic computing devices. For instance, server system 6 may include any of the types of electronic computing devices described above.

System 2 also includes a network 8. Network 8 is an electronic communication network. Network 8 facilitates electronic communication between client system 4 and server system 6. For example, network 8 may be a wide-area network, such as the Internet. In other examples, network 8 may be a local-area network, a metropolitan-area network, or another type of electronic communication network. Network 8 may include wired and/or wireless data links. A variety of communications protocols may be used in network 8. Such communications protocols include, but are not limited to, Ethernet, Transmission Control Protocol (TCP), Internet Protocol (IP), HTTP, SOAP, remote procedure call protocols, user datagram protocol (UDP), IPSec, Resource Reservation Protocol (RSVP), Internet Control Message Protocol (ICMP), and/or other types of communications protocols.

Server system 6 operates an HTTP server. The HTTP server is configured to receive HTTP requests from network 8 and to send HTTP responses on network 8. Client system 4 operates an HTTP client. The HTTP client is configured to send HTTP requests on network 8 and to receive HTTP responses from network 8.

As described in greater detail below, client system 4 and server system 6 use an HTTP authentication mode preference header to negotiate an HTTP authentication mode. Client system 4 sends an HTTP request to server system 6. In response to the HTTP request, server system 6 sends an HTTP response to client system 4. The HTTP response includes an HTTP authentication mode preference header. The HTTP authentication mode preference header indicates whether a preferred HTTP authentication mode is connection-based HTTP authentication or request-based HTTP authentication. For example, the HTTP authentication mode preference header may indicate whether an authorization header will be required for the next request on the connection based on whether the preferred server system uses connection-based HTTP authentication or request-based HTTP authentication. In subsequent HTTP requests to server system 6, client system 4 uses the HTTP authentication mode indicated by the HTTP authentication mode preference header.

When server system 6 is configured to use request-based HTTP authentication, use of the HTTP authentication mode preference header may reduce the number of messages that client system 4 and server system 6 must exchange for client system 4 to obtain a resource from server system 6. For example, server system 6 may be configured to use request-based HTTP authentication and client system 4 may be configured to assume that server system 6 uses connection-based HTTP authentication. In this example, client system 4 would send a first HTTP request that does not include an authorization header. An authorization header is an HTTP header containing authentication data. In response to the first HTTP request, server system 6 would send an HTTP rejection response. The HTTP rejection response indicates that client system 4 is not authorized to access the requested resource. In response to the HTTP rejection response, client system 4 would send a second HTTP request, the second HTTP request including an authorization header. As a result, client system 4 would effectively send two HTTP requests to retrieve a single resource from server system 6. In this example, the HTTP authentication mode preference header indicates to client system 4 that the preferred HTTP authentication mode is request-based HTTP authentication. Based on the HTTP authentication mode preference header, client system 4 uses request-based HTTP authentication in subsequent HTTP requests to server system 6. Because client system 4 uses request-based HTTP authentication in subsequent HTTP requests to server system 6, client system 4 includes authorization headers in the subsequent HTTP requests to server system 6. Consequently, there may be no need for server system 6 to send HTTP rejection responses and there may be no need for client system 4 to respond by sending additional HTTP requests including authorization headers.

Moreover, use of the HTTP authentication mode preference header may reduce the number of authorization headers that client system 4 generates. For example, server system 6 may be configured to use connection-based HTTP authentication and client system 4 may be configured to assume that server system 6 uses request-based HTTP authentication. In this example, client system 4 would generate an authorization header in each HTTP request sent to server system 6. However, such authorization headers would be unnecessary because server system 6 assumes that all HTTP requests on an authenticated TCP connection are authentic. In this example, the HTTP authentication mode preference header indicates to client system 4 that the preferred HTTP authentication mode is connection-based HTTP authentication. Based on the HTTP authentication preference header, client system 4 uses connection-based HTTP authentication in subsequent HTTP requests to server system 6. Because client system 4 uses connection-based HTTP authentication in subsequent HTTP requests to server system 6, client system 4 does not go to the unnecessary effort of generating authorization headers for HTTP requests on authenticated TCP connections.

Figure 2:
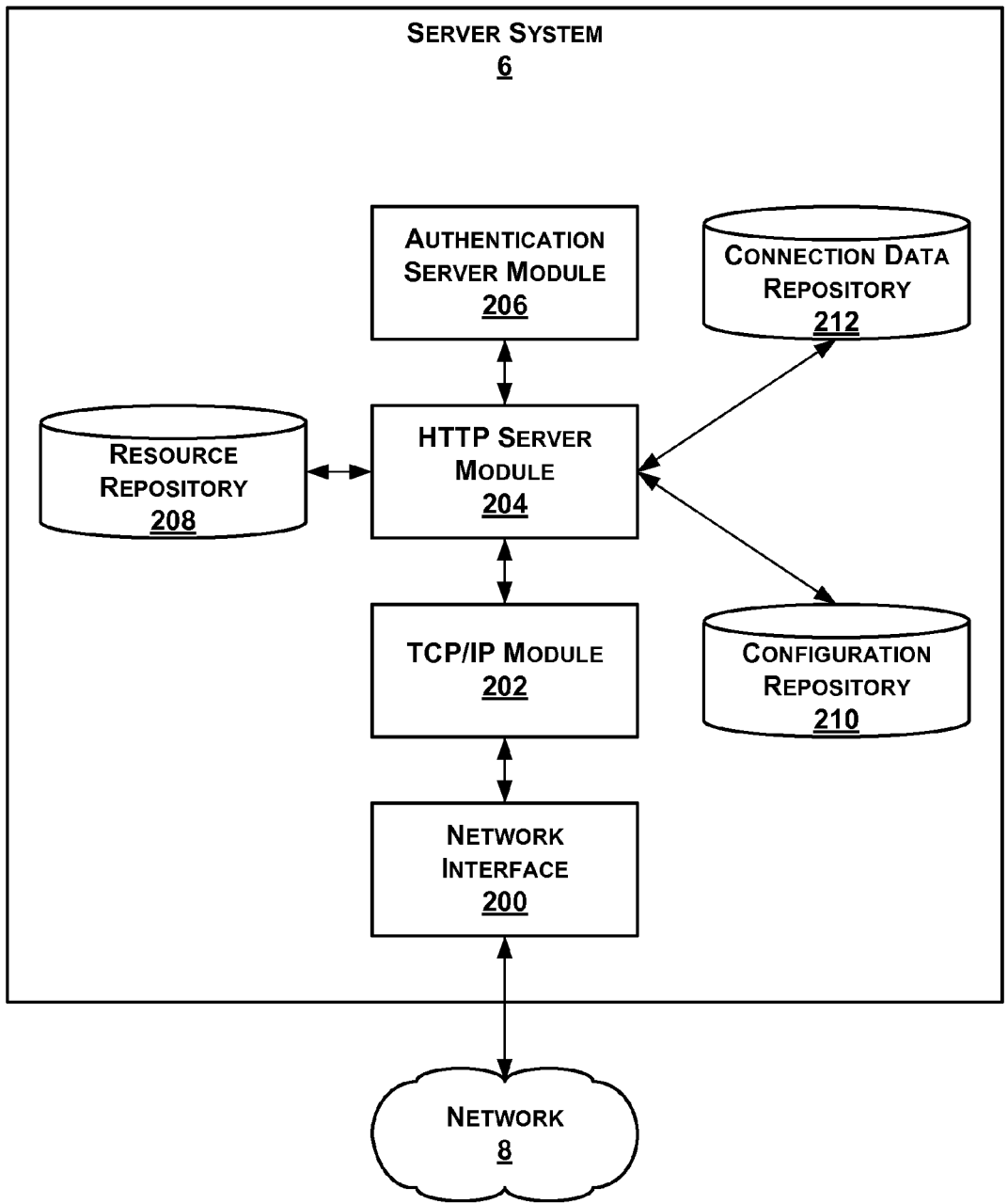
FIG. 2 is a block diagram illustrating example logical details of a server system.

FIG. 2 is a block diagram illustrating example logical details of server system 6. It should be understood that FIG. 2 is provided for purposes of explanation only. The behavior of server system 6 may be logically represented in a wide variety of ways. For example, the behavior of server system 6 may be logically represented using more or fewer components.

As illustrated in the example of FIG. 2, server system 6 includes a network interface 200, a Transmission Control Protocol/Internet Protocol (TCP/IP) module 202, an HTTP server module 204, an authentication server module 206, a resource repository 208, a configuration repository 210, and a connection data repository 212. Network interface 200 enables server system 6 to communicate on network 8. TCP/IP module 202 receives TCP/IP messages from network interface 200, extracts HTTP requests from the TCP/IP messages, and provides the HTTP requests to HTTP server module 204. Furthermore, TCP/IP module 202 receives HTTP responses from HTTP server module 204, encapsulates the HTTP responses in TCP/IP messages, and provides the TCP/IP messages to network interface 200 for transmission on network 8. As described in detail below with reference to FIG. 4, HTTP server module 204 receives HTTP requests from TCP/IP module 202. In response to the HTTP requests, HTTP server module 204 retrieves requested data from resource repository 208, if appropriate based on configuration data in configuration repository 210. HTTP server module 204 then generates HTTP responses containing the requested data. HTTP server module 204 then provides the HTTP responses to TCP/IP module 202 for eventual transmission on network 8.

HTTP server module 204 interacts with authentication server module 206 to perform an authentication process using a security protocol. A security protocol is a protocol that performs authentication and possibly additional security services on a network. In one example implementation, authentication server module 206 implements the Generic Security Services Application Programming Interface (GSS-API). Internet Engineering Task Force (IETF) RFC 2743 describes the GSS-API. The entire content of IETF RFC 2743 is hereby incorporated by reference. Authentication server module 206 may implement the GSS-API in a variety of ways. For example, authentication server module 206 may implement the GSS-API such that authentication server module 206 uses a Kerberos security protocol. In another example, authentication server module 206 may implement the GSS-API such that authentication server module 206 uses a NT LAN Manager (NTLM) security protocol. In other examples, authentication server module 206 may implement the GSS-API such that authentication server module 206 uses other security protocols.

In one example implementation, authentication server module 206 implements a security protocol negotiation mechanism. Client systems and server systems may support a variety of security protocols. Consequently, client systems and server systems negotiate which security protocol to use. A security protocol negotiation mechanism enables a client system and a server system to negotiate a security protocol. For example, authentication server module 206 may implement the Simple and Protected GSS-API negotiation mechanism (SPNEGO). IETF RFC 4178 describes SPNEGO. The entire content of IETF RFC 4178 is hereby incorporated by reference. SPNEGO enables client system 4 and server system 6 to negotiate a security protocol. SPNEGO enables client system 4 and server system 6 to negotiate a variety of security protocols. For example, SPNEGO enables client system 4 and server system 6 to negotiate the use of the Kerberos security protocol, the NTLM security protocol, and/or other security protocols.

In another example, authentication server module 206 may implement the Nego2 negotiation mechanism. Like SPNEGO, the Nego2 negotiation mechanism enables client system 4 and server system 6 to negotiate a security protocol. The Nego2 negotiation mechanism may enable client system 4 and server system 6 to negotiate security protocols in addition to those that can be negotiated using SPNEGO. For example, the Nego2 negotiation mechanism may enable client system 4 and server system 6 to negotiate the use of the NegoExtender security protocol, the LiveID security protocol, the Federated SSP security protocol, and/or other security protocols.

Resource repository 208 stores resources. As used in this disclosure, a resource is an entity that can be identified in a networked information system. Example types of resources include static Web pages, dynamically-generated Web pages, documents, files, scripts, applets, ActiveX controls, media streams, sockets, and other entities that can be identified in a networked information system.

Configuration repository 210 stores configuration information. In various example implementations, the configuration information indicates whether HTTP authentication is required to access particular resources, indicates HTTP authentication modes required to access particular resources, indicates authentication credentials, and so on.

Connection data repository 212 stores connection data. The connection data indicates an HTTP authentication status of each active TCP connection between server system 6 and client systems. For example, the connection data may indicate that successful HTTP authentication has occurred on a first TCP connection between server system 6 and client system 4. In another example, the connection data may indicate that successful HTTP authentication has not occurred on a second TCP connection between server system 6 and client system 4.

Resource repository 208, configuration repository 210, and connection data repository 212 may be implemented in a wide variety of ways. For example, resource repository 208, configuration repository 210, and/or connection data repository 212 may be implemented as relational databases. In another example, resource repository 208, configuration repository 210, and/or connection data repository 212 may be implemented as file systems. In another example, resource repository 208, configuration repository 210, and/or connection data repository 212 may be implemented as directories. In another example, resource repository 208, configuration repository 210, and/or connection data repository 212 may be implemented as an array of memory locations.

Network interface 200, TCP/IP module 202, HTTP server module 204 and authentication server module 206 may be implemented in a wide variety of ways. In a first example, network interface 200, TCP/IP module 202, HTTP server module 204 and/or authentication server module 206 may be implemented as sets of instructions stored at a data storage system. As used in this disclosure, a data storage system is a set of one or more computer-readable data storage mediums. In this first example, a processing unit within server system 6 may execute the sets of instructions, thereby causing server system 6 to perform the behaviors associated with network interface 200, TCP/IP module 202, HTTP server module 204 and/or authentication server module 206. As used in this disclosure, a processing unit is a set of one or more physical electronic integrated circuits that are capable of executing instructions. In a second example, network interface 200, TCP/IP module 202, HTTP server module 204 and/or authentication server module 206 are implemented as one or more application specific integrated circuits (ASICs). The ASICs cause server system 6 to perform the behaviors associated with network interface 200, TCP/IP module 202, HTTP server module 204 and/or authentication server module 206. In this second example, the ASICs may be specifically designed to perform the behaviors associated with network interface 200, TCP/IP module 202, HTTP server module 204 and/or authentication server module 206.

Figure 3:
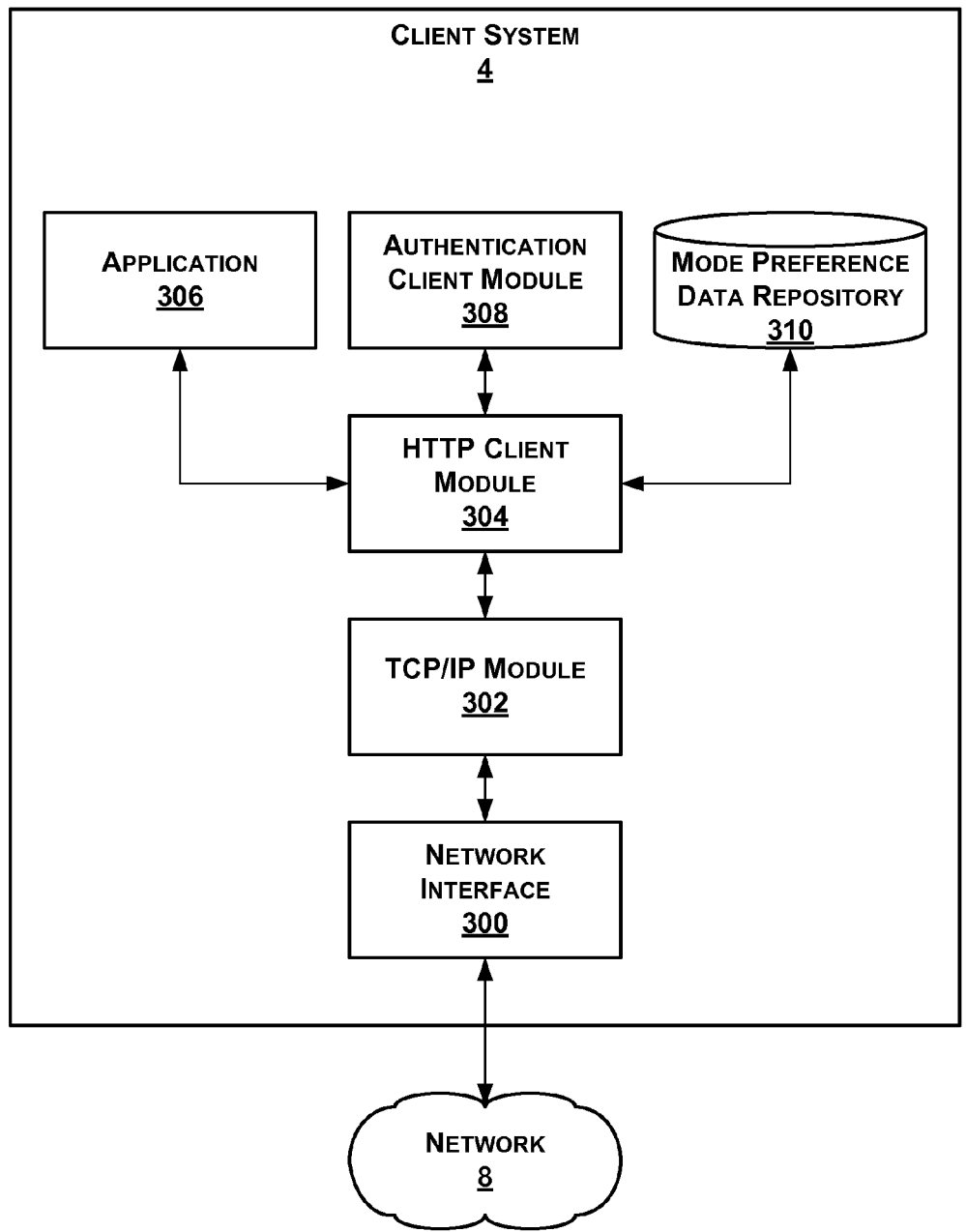
FIG. 3 is a block diagram illustrating example logical details of a client system.

FIG. 3 is a block diagram illustrating example logical details of client system 4. It should be understood that FIG. 3 is provided for purposes of explanation only. The behavior of client system 4 may be logically represented in a wide variety of ways. For example, the behavior of client system 4 may be logically represented using more or fewer components.

As illustrated in the example of FIG. 3, client system 4 includes a network interface 300, a TCP/IP module 302, an HTTP client module 304, an application 306, an authentication client module 308, and a mode preference data repository 310. Network interface 300 enables client system 4 to communicate on network 8. TCP/IP module 302 receives TCP/IP messages from network interface 300, extracts HTTP messages from the TCP/IP messages, and provides the HTTP messages to HTTP client module 304. Furthermore, TCP/IP module 302 receives HTTP messages from HTTP client module 304, encapsulates the HTTP messages in TCP/IP messages, and provides the TCP/IP messages to network interface 300 for transmission on network 8. HTTP client module 304 receives HTTP responses from TCP/IP module 302, extracts application data from the HTTP responses, and provides the application data to application 306. Furthermore, HTTP client module 304 receives resource requests from application 306, generates HTTP requests requesting the resources, and provides the HTTP requests to TCP/IP module 302 for eventual transmission on network 8.

HTTP client module 304 interacts with authentication client module 308 to perform an authentication process that uses a security protocol. In one example implementation, authentication client module 308 implements the GSS-API. Furthermore, authentication client module 308 may, for example, implement SPNEGO. In another example, authentication client module 308 may implement the Nego2 negotiation mechanism.

Application 306 may be a wide variety of different types of application. For example, application 306 may be a web browser application. In another example, application 306 may be another interface module in a protocol stack. For instance, application 306 may be a module that provides a remote procedure call (RPC) protocol interface.

Mode preference data repository 310 stores mode preference data. The mode preference data specifies preferred HTTP authentication modes. For example, the mode preference data may specify that the preferred HTTP authentication mode of server system 6 is connection-based HTTP authentication. Mode preference data repository 310 may be implemented in a wide variety of ways. For example, mode preference data repository 310 may be implemented in a relational database. In another example, mode preference data repository 310 may be implemented in a file system. In another example, mode preference data repository 310 may be implemented as a directory. In another example, mode preference data repository 310 may be implemented as an array of memory locations.

Network interface 300, TCP/IP module 302, HTTP client module 304, application 306 and authentication client module 308 may be implemented in a wide variety of ways. In a first example, network interface 300, TCP/IP module 302, HTTP client module 304, application 306 and/or authentication client module 308 may be implemented as sets of instructions. In this first example, a processing unit within client system 4 may execute the sets of instructions, thereby causing client system 4 to perform the behaviors associated with network interface 300, TCP/IP module 302, HTTP client module 304, application 306, and/or authentication client module 308. In a second example, network interface 300, TCP/IP module 302, HTTP client module 304, application 306 and/or authentication client module 308 may be implemented as one or more ASICs. The ASICs cause client system 4 to perform the behaviors associated with network interface 300, TCP/IP module 302, HTTP client module 304, application 306 and/or authentication client module 308. In this second example, the ASICs may be specifically designed to perform the behaviors associated with network interface 300, TCP/IP module 302, HTTP client module 304, application 306 and/or authentication client module 308.

Figure 4:
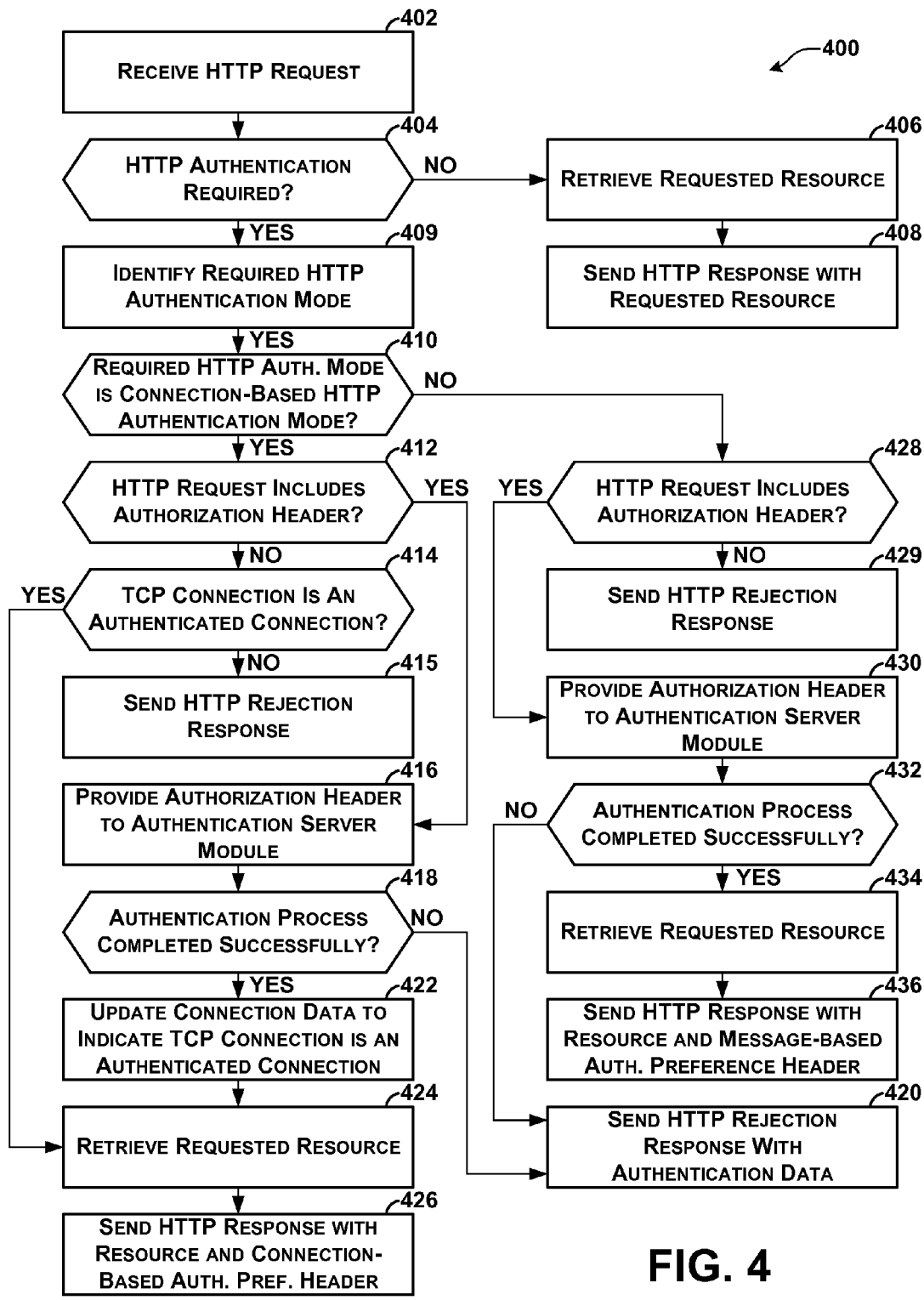
FIG. 4 is a flowchart illustrating an example operation of the server system.

FIG. 4 is a flowchart illustrating an example operation 400 of server system 6. It should be appreciated that operation 400 is merely an example. For example, other operations of server system 6 may include more or fewer steps. In other examples, server system 6 may perform the steps of operation 400 in a different order.

As illustrated in the example of FIG. 4, operation 400 starts when HTTP server module 204 receives an HTTP request from TCP/IP module 202 (402). The HTTP request was originally sent by a requesting client system. For example, the requesting client system may be client system 4. When HTTP server module 204 receives the HTTP request, HTTP server module 204 may also receive connection identification information from TCP/IP module 202. The connection identification information identifies a TCP connection on which TCP/IP module 202 received the HTTP request. The HTTP request requests a resource stored in resource repository 208. For example, HTTP server module 204 may receive the following HTTP request:

```
GET /dir1/index.html HTTP/1.1
Host: www.contoso.com
```

After HTTP server module 204 receives the HTTP request, HTTP server module 204 determines whether HTTP authentication is required to access the requested resource (404). In one example implementation, HTTP server module 204 uses configuration information stored in configuration repository 210 to determine whether HTTP authentication is required to access the requested resource.

If HTTP server module 204 determines that HTTP authentication is not required to access the requested resource ("NO" of 404), HTTP server module 204 retrieves the requested resource (406). In one example implementation, HTTP server module 204 retrieves the requested resource from resource repository 208. Retrieval of the requested resource may require the execution of one or more programs. After retrieving the requested resource, HTTP server module 204 instructs TCP/IP module 202 to send an HTTP response (408). The HTTP response contains the requested resource.

On the other hand, if HTTP server module 204 determines that HTTP authentication is required to access the requested resource ("YES" of 404), HTTP server module 204 identifies a required HTTP authentication mode (409). The required HTTP authentication mode is the HTTP authentication mode required to access the requested resource. In one example implementation, HTTP server module 204 uses configuration information stored in configuration repository 210 to identify the required HTTP authentication mode. Next, HTTP server module 204 determines whether the required HTTP authentication mode is connection-based HTTP authentication (410).

If the required HTTP authentication mode is connection-based HTTP authentication ("YES" of 410), HTTP server module 204 determines whether the HTTP request includes an authorization header (412). As described below, the content of the authorization header may vary depending on the security protocol used.

If HTTP server module 204 determines that the HTTP request does not include an authorization header ("NO" of 412), HTTP server module 204 determines whether the TCP connection is an authenticated connection (414). HTTP server module 204 may use connection data in connection data repository 212 to determine whether the TCP connection is an authenticated connection.

If HTTP server module 204 determines that the TCP connection is not an authenticated connection ("NO" of 414), HTTP server module 204 instructs TCP/IP module 202 to send an HTTP rejection response to the requesting client system (415). For example, if client system 4 sent the HTTP request, HTTP server module 204 instructs TCP/IP module 202 to send the HTTP rejection response to client system 4. The HTTP rejection response may include the status code "401 Unauthorized." According to the HTTP protocol, the status code "401 Unauthorized" indicates that the requesting client system is not unauthorized to access the requested resource. Furthermore, the HTTP rejection response includes an authentication response header. The authentication response header specifies authentication data. The authentication data indicates an authentication scheme and may indicate a set of authentication parameters. An authentication scheme is a model for enabling a client system to authenticate to a server system. A client system and a server system using an authentication scheme perform an authentication process defined by the authentication scheme to authenticate the client system to the server system. The content of the authentication data may vary depending on how HTTP server module 204 is configured. For example, if HTTP server module 204 is configured to use SPNEGO to negotiate a security protocol, the authentication scheme specifies "Negotiate" and the set of authentication parameters is empty. In this example, HTTP server module 204 may instruct TCP/IP module 202 to send the following HTTP response:

---
HTTP/1.1 401 UNAUTHORIZED
Date: Mon, 19 Jan 2009 14:47:54 GMT
Server: IIS/7.0 (Windows)
WWW-Authenticate: Negotiate

---

In this example, the "WWW-Authenticate" header is the authentication response header.

If HTTP server module 204 determines that the HTTP request includes an authorization header ("YES" of 412), HTTP server module 204 provides the authorization header to authentication server module 206 (416). When authentication server module 206 receives the authorization header, authentication server module 206 performs one or more actions in an authentication process. Authentication server module 206 may be configured to perform a variety of authentication processes. For example, authentication server module 206 may be configured to perform an authentication process that uses a Kerberos security protocol. In this example, the authorization header in the HTTP request may include a client-to-server ticket and an authenticator. The client-to-server ticket includes a client identifier, a client network address, a validity period, and a client/server session key. The client-to-server ticket is encrypted using the secret key of server system 6. The authenticator includes the client identifier and a timestamp. The authenticator is encrypted using the client/server session key. In a second example, authentication server module 206 may perform an authentication process that uses a NT LAN Manager (NTLM) security protocol. In this second example, the authorization header may contain a set of flags. The set of flags indicates features supported by the requesting client system and/or features requested by the requesting client system. In a third example, authentication server module 206 is configured to use SPNEGO to negotiate a security protocol. In a fourth example, HTTP server module 204 may perform an authentication process using a MS-CHAP security protocol. It should be appreciated that server system 6 may use network 8 to exchange one or more messages with one or more other systems (including the requesting client system) during the authentication process.

After providing the authorization header to authentication server module 206, HTTP server module 204 determines whether the authentication process was completed successfully (418). The authentication process is completed successfully if HTTP server module 204 successfully authenticates the requesting client system. The authentication process is not completed successfully if the authentication process is not finished or if the authentication process ends without HTTP server module 204 successfully authenticating the requesting client system. If the authentication process was not successful ("NO" of 418), HTTP server module 204 instructs TCP/IP module 202 to send an HTTP rejection response to the requesting client system (420). The HTTP rejection response includes an authentication response header. The authentication response header specifies authentication data generated by authentication server module 206 in response to the authorization header. For example, if HTTP server module 204 is configured to use SPNEGO to negotiate a security protocol, HTTP server 204 may instruct TCP/IP module 202 to send the following HTTP response:

---
HTTP/1.1 401 UNAUTHORIZED
Date: Mon, 19 Jan 2009 14:47:54 GMT
Server: IIS/7.0 (Windows)
WWW-Authenticate: Negotiate 749efa7b23409c20b92356

---

In this example, "Negotiate" identifies a security protocol and "749efa7b23409c20b92356" is a parameter generated by authentication server module 206 in response to the authorization header.

If HTTP server module 204 determines that the authentication process was successful ("YES" of 418), HTTP server module 204 updates the connection data in connection data repository 212 to indicate that the TCP connection is an authenticated connection (422).

After updating the connection data or after determining that the TCP connection is an authenticated connection ("YES" of 414), HTTP server module 204 retrieves the requested resource from resource repository 208 (424). As discussed above, retrieving the requested resource from resource repository 208 may involve the execution of one or more scripts. Such scripts dynamically generate the requested resource. After retrieving the requested resource from resource repository 208, HTTP server module 204 instructs TCP/IP module 202 to send an HTTP response that includes the requested resource and an HTTP authentication mode preference header (426). In this case, the HTTP authentication mode preference header indicates that the preferred HTTP authentication mode is connection-based HTTP authentication. The HTTP authentication mode preference header may indicate the preferred HTTP authentication mode in a variety of ways. In one example implementation, the HTTP authentication mode preference header indicates the preferred HTTP authentication mode using a Boolean value, i.e., true or false. The following is example HTTP response that HTTP server module 204 may instruct TCP/IP module 202 to send:

```
HTTP/1.1 200 OK
Date: Mon, 19 Jan 2009 14:47:54 GMT
Server: IIS/7.0 (Windows)
Last-modified: Wed, 23 May 2008 08:45:01 GMT
Etag: "3f80f-1b5-3e1cb03b"
Accept-Range: bytes
Content-Length: 438
Connection: open
Content-Type: text/html; charset=UTF-8
Persistent-Auth: true
[REQUESTED RESOURCE]
```

In this example, the HTTP header "Persistent-Auth: true" is an HTTP authentication mode preference header. In this example, the HTTP header "Persistent-Auth" indicates that the preferred HTTP authentication mode is connection-based HTTP authentication and that subsequent requests will likely not require an authorization header. Although not illustrated in the above example, the HTTP response may include an authentication response header. The authentication response header contains authentication data generated by authentication server module 206 in response to the authorization header.

If HTTP server module 204 determines that the required HTTP authentication mode is not connection-based HTTP authentication ("NO" of 410), HTTP server module 204 determines whether the HTTP request includes an authorization header (428). If HTTP server module 204 determines that the HTTP request does not include an authorization header ("NO" of 432), HTTP server module 204 instructs TCP/IP module 202 to send an HTTP rejection response to the requesting client system (429). The HTTP rejection response includes an authentication response header identifying an authentication scheme. For example, the HTTP rejection response may include an authentication response header identifying the Nego2 authentication scheme.

If HTTP server module 204 determines that the HTTP request includes an authorization header ("YES" of 428), HTTP server module 204 provides the authorization header to authentication server module 206 (430). When HTTP server module 204 provides the authorization header to authentication server module 206 in step 430, authentication server module 206 may perform one or more actions in the same authentication process performed in step 416. After providing the authorization header to authentication server module 206, HTTP server module 204 determines whether the authentication process was completed successfully (432).

If HTTP server module 204 determines that the authentication process was completed successfully ("YES" of 432), HTTP server module 204 retrieves the requested resource from resource repository 208 (434). Next, HTTP server module 204 instructs TCP/IP module 202 to send an HTTP response that includes the requested resource and an HTTP authentication mode preference header (436). In this case, the HTTP authentication mode preference header indicates that the preferred HTTP authentication mode is request-based HTTP authentication. For example, HTTP server module 204 may instruct TCP/IP module 202 to send the following HTTP response:

```
HTTP/1.1 200 OK
Date: Mon, 19 Jan 2009 14:47:54 GMT
Server: IIS/7.0 (Windows)
Last-modified: Wed, 23 May 2008 08:45:01 GMT
Etag: "3f80f-1b5-3e1cb03b"
Accept-Range: bytes
Content-Length: 438
Connection: open
Content-Type: text/html; charset=UTF-8
Persistent-Auth: false
[REQUESTED RESOURCE]
```

In this example, the HTTP header "Persistent-Auth: false" is an HTTP authentication mode preference header. In this example, the HTTP header Persistent-Auth" indicates that the preferred HTTP authentication mode of server system 6 is request-based HTTP authentication and that subsequent requests will likely require an authorization header.

Figure 5:
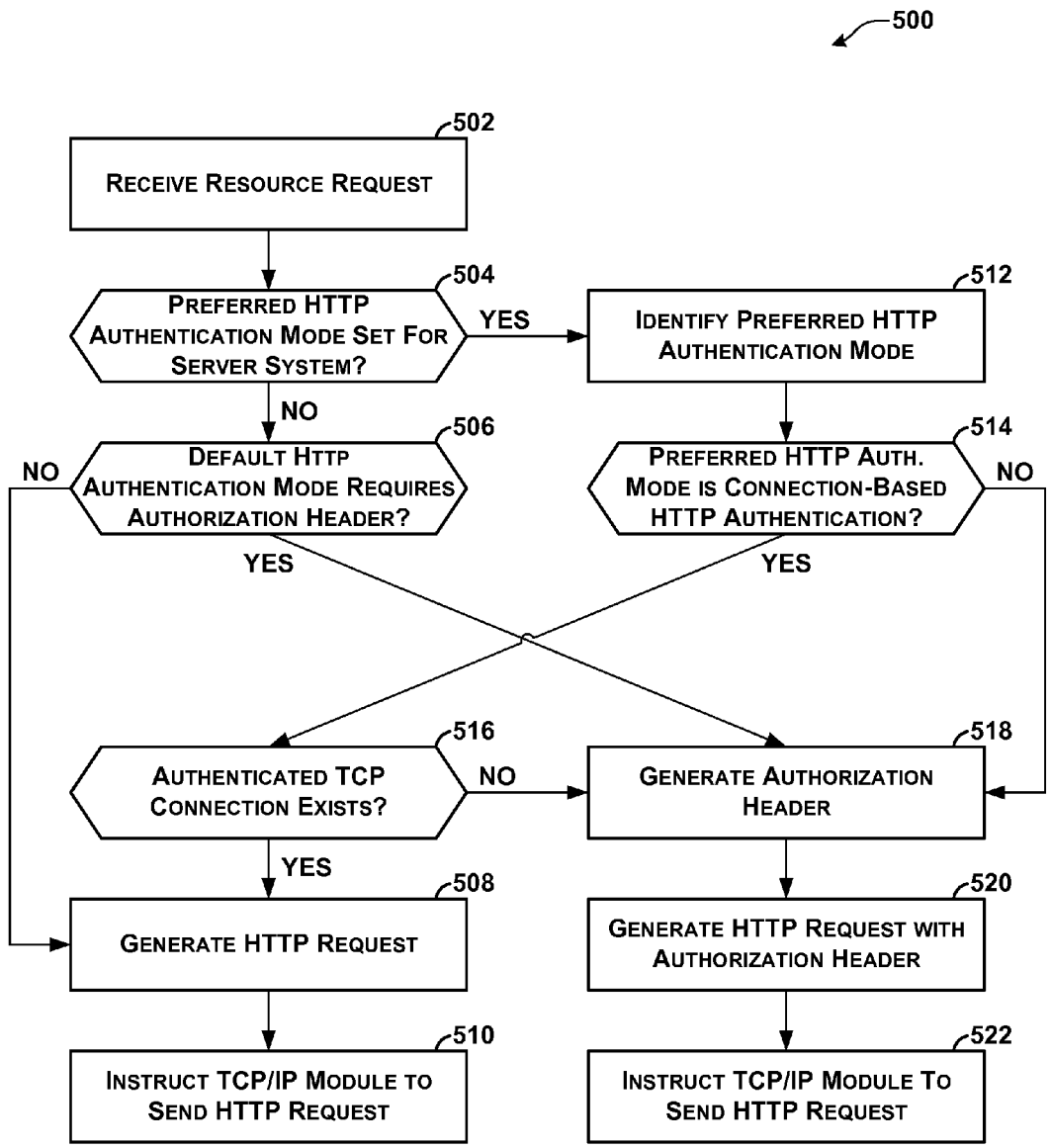
FIG. 5 is a flowchart illustrating an example operation of the client system when sending a Hypertext Transfer Protocol (HTTP) request.

FIG. 5 is a flowchart illustrating an example operation 500 of client system 4 when sending an HTTP request. It should be appreciated that operation 500 is merely an example. For example, other operations of client system 4 may include more or fewer steps. In other examples, client system 4 may perform the steps of operation 400 in a different order.

Initially, HTTP client module 304 receives a resource request from application 306 (502). The resource request may specify a domain name and a resource name. For example, the resource request may specify the domain name "www.contoso.com" and the resource name "directory/index.html." In one example implementation, HTTP client module 304 implements an HTTP API. In this example implementation, HTTP client module 304 receives the resource request when a module invokes a method of the HTTP API. HTTP client module 304 may receive resource requests from a variety of modules. For example, HTTP client module 304 may receive resource requests from application 306, authentication client module 308, and/or other modules operating at client system 4 or another system.

In response to receiving the resource request, HTTP client module 304 determines whether a preferred HTTP authentication mode has been set for a target server system (504). HTTP client module 304 may use mode preference data in mode preference data repository 310 to determine whether a preferred HTTP authentication mode has been set for the target server system. The target server system is a server system associated with the domain name specified in the resource request. For example, if the resource request specifies the domain name "www.contoso.com" and if server system 6 is the server system associated with the domain name "www.contoso.com," HTTP client module 304 uses mode preference data in mode preference data repository 310 to determine whether a preferred HTTP authentication mode has been set for server system 6.

It should be appreciated that in some example implementations, HTTP client module 304 may determine in a variety of different ways whether a preferred HTTP authentication mode has been set. In a first example, HTTP client module 304 may determine whether a preferred HTTP authentication mode has been set for an individual connection to a target server system. In this first example, connection-based HTTP authentication may be the preferred HTTP authentication mode for a first TCP connection to the target server system and request-based HTTP authentication mode may be the preferred HTTP authentication mode for a second TCP connection to the target server system. In a second example, HTTP client module 304 may determine whether a preferred HTTP authentication mode has been set for individual resources provided by the target server system. In this second example, connection-based HTTP authentication may be the preferred HTTP authentication mode for a first resource provided by the target server system and request-based HTTP authentication may be the preferred HTTP authentication mode for a second resource provided by the target server system.

If a preferred HTTP authentication mode has not been set for server system 6 ("NO" of 504), HTTP client module 304 determines whether a default HTTP authentication mode requires an authorization header (506). The default HTTP authentication mode is the HTTP authentication mode that HTTP client module 304 uses by default. For example, an administrator may configure the default HTTP authentication mode to be connection-based HTTP authentication or may configure the default HTTP authentication mode to be request-based HTTP authentication.

If HTTP client module 304 determines that the default HTTP authentication mode does not require an authorization header ("NO" of 506), HTTP client module 304 generates an HTTP request (508). For example, if HTTP client module 304 determines that the default HTTP authentication mode is connection-based HTTP authentication, HTTP client module 304 generates an HTTP request. The HTTP request specifies the resource name and the domain name. In the example of FIG. 5, the HTTP request does not include an authorization header. For example, HTTP client module 304 may generate the following HTTP request:

---
GET /dir1/index.html HTTP/1.1
Host: www.contoso.com

---

Next, HTTP client module 304 instructs TCP/IP module 302 to send the HTTP request to the target server system (510). In one example implementation, HTTP client module 304 may instruct TCP/IP module 302 to send the HTTP request by invoking a method of an API provided by an operating system of client system 4. In this example implementation, HTTP client module 304 may provide the HTTP request and the domain name as parameters of the method.

If a preferred HTTP authentication mode has been set for server system 6 ("YES" of 504), HTTP client module 304 identifies a preferred HTTP authentication mode for the target server system (512). HTTP client module 304 may use mode preference data in mode preference data repository 310 to identify the preferred HTTP authentication mode for the target server system. HTTP client module 304 then determines whether the preferred HTTP authentication mode for the target server is connection-based HTTP authentication (514).

If HTTP client module 304 determines that the preferred HTTP authentication mode for the target server system is connection-based HTTP authentication ("YES" of 514), HTTP client module 304 determines whether an authenticated TCP connection exists between client system 4 and the target server system (516). An authenticated TCP connection may exist between client system 4 and the target server system when client system 4 has previously established a TCP connection with the target server system and has used the TCP connection to successfully perform an authentication process.

If HTTP client module 304 determines that an authenticated TCP connection exists between client system 4 and the target server system ("YES" of 516), HTTP client module 304 generates an HTTP request (508). The HTTP request does not include an authorization header. Next, HTTP client module 304 instructs TCP/IP module 302 to send the HTTP request to the target server system (510).

If HTTP client module 304 determines that the preferred HTTP authentication mode for the target server system is not connection-based HTTP authentication ("NO" of 514) or if no authenticated TCP connection exists between client system 4 and the target server system ("NO" of 516) or if HTTP client module 304 determines that the default HTTP authentication mode requires an authorization header ("YES" of 506), HTTP client module 304 generates an authorization header (518). In this disclosure, it is assumed that if the preferred HTTP authentication mode is not connection-based HTTP authentication, the preferred HTTP authentication mode must be request-based HTTP authentication. As discussed above, the content of the authorization header may depend on the type of authentication process to be used.

In one example implementation, HTTP client module 304 generates the authentication by first invoking a method provided by authentication client module 308. In response to invoking the method provided by authentication client module 308, HTTP client module 304 receives authentication data from the method. After receiving the authentication data, HTTP client module 304 generates an authorization header that includes the authentication data. In generating the authentication data, authentication client module 308 may require client system 4 to use network 8 to exchange one or more messages with one or more systems. For example, generating the authorization header may require client system 4 to use network 8 to exchange one or more messages with a Kerberos authentication server and a Kerberos ticket granting server.

After generating the authorization header, HTTP client module 304 generates an HTTP request that includes the authorization header (520). For example, HTTP client module 304 may generate the following HTTP request:

---
GET /dir1/index.html HTTP/1.1
Host: www.contoso.com
Authorization: Basic 4erg454g4tyw9d87df5g4yg879t8ae8t7g54

---

In this example, "Authorization: Basic . . . " is the authorization header. Furthermore, in this example, the authorization header specifies that HTTP client module 304 is using the "Basic" authentication scheme. IETF RFC 2617 describes the "Basic" authentication scheme. The entire content of IETF RFC 2617 is hereby incorporated by reference.

Once HTTP client module 304 generates the HTTP request, HTTP client module 304 instructs TCP/IP module 302 to send the HTTP request to the target server system (522).

Figure 6:
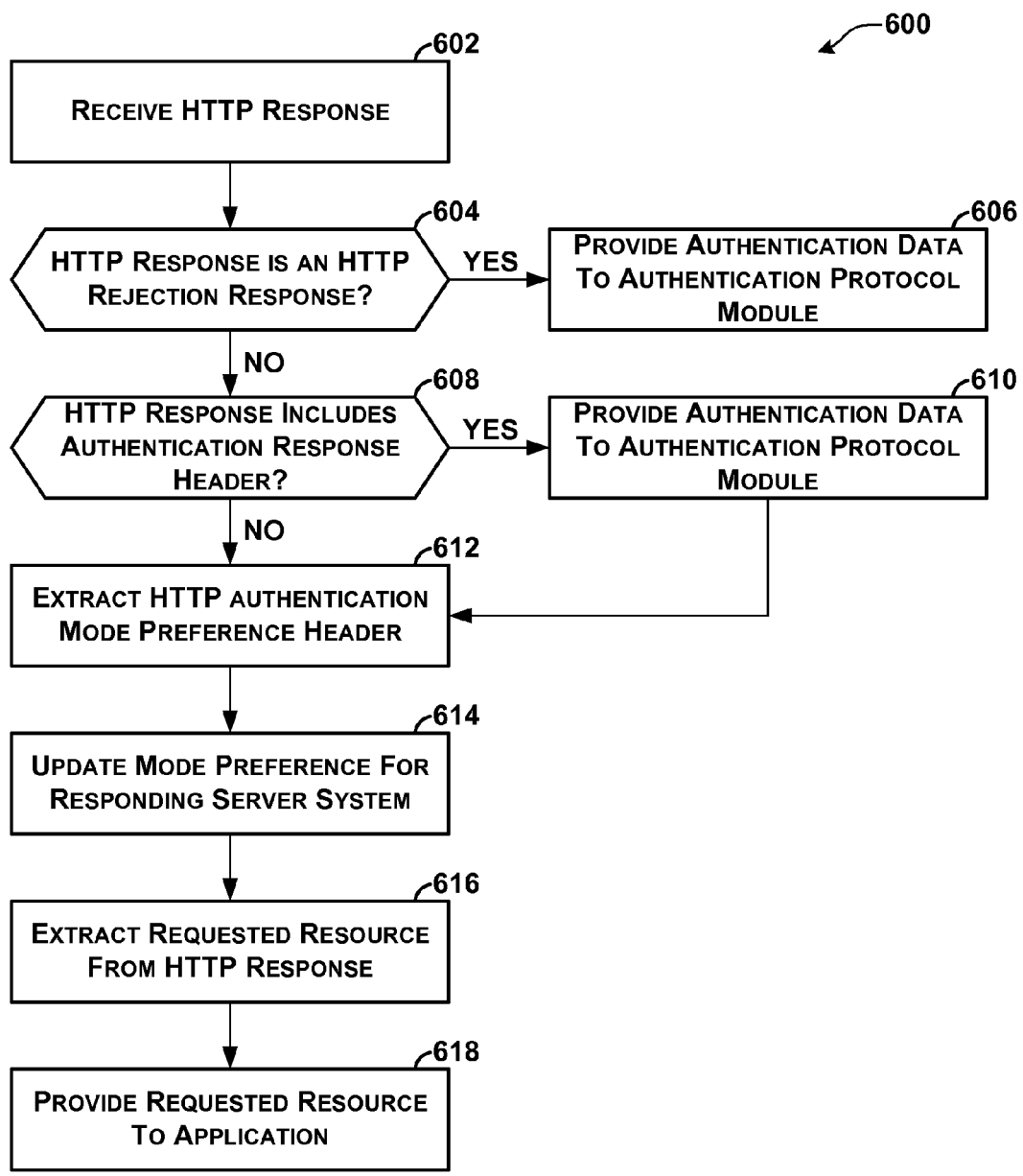
FIG. 6 is a flowchart illustrating an example operation of the client system when receiving an HTTP response.

FIG. 6 is a flowchart illustrating an example operation 600 of client system 4 when receiving an HTTP response. It should be appreciated that operation 600 is merely an example. For example, other operations of client system 4 may include more or fewer steps. In other examples, client system 4 may perform the steps of operation 600 in a different order.

Initially, HTTP client module 304 receives an HTTP response from TCP/IP module 302 (602). The HTTP response is a response by a responding server system to an HTTP request for a resource. For example, the HTTP response may be a response by server system 6 to an HTTP request sent by client system 4. The HTTP response includes an HTTP header. The HTTP header includes a status code. In one example implementation, the status codes are the status codes defined in IETF RFC 2616, the entire content of which is hereby incorporated by reference.

After receiving the HTTP response, HTTP client module 304 determines whether the HTTP response is an HTTP rejection response (604). For example, HTTP client module 304 may determine that the HTTP response specifies a rejection status code if the HTTP response specifies the status code "401 Unauthorized." As mentioned above, an HTTP response including the status code "401 Unauthorized" also includes an authentication response header. The authentication response header contains authentication data.

If HTTP client module 304 determines that the HTTP response is an HTTP rejection response ("YES" of 604), HTTP client module 304 provides authentication data to authentication client module 308 (606). As discussed above, HTTP rejection responses include authentication response headers. An authentication response header specifies authentication data. The authentication data includes an authentication scheme identifier and may include authentication parameters. In one example implementation, HTTP client module 304 provides the authentication data to authentication client module 308 by invoking a method of authentication client module 308 associated with the authentication scheme indicated by the authentication scheme identifier. When invoking the method, HTTP client module 304 provides the authentication parameters as parameters of the method.

When authentication client module 308 receives the authentication data, authentication client module 308 may perform one or more actions in an authentication process. For example, authentication client module 308 may prompt a user of client system 4 to provide a username and password. In this example, after the authentication client module 308 receives the username and password, authentication client module 308 may send a new resource request to HTTP client module 304. The new resource request specifies the username and password. In response to the new resource request, HTTP client module 304 may perform operation 500 (FIG. 5) again, using the username and password as part of a process to generate the authorization header.

In a second example, the authentication response header specifies a "Negotiate" authentication scheme identifier. The "Negotiate" authentication scheme identifier indicates that the responding server system wants to use SPNEGO to negotiate a security protocol. In this second example, HTTP client module 304 invokes a Negotiate method implemented by authentication client module 308. In response, authentication client module 308 negotiates a security protocol with the responding server system and then uses the negotiated security protocol to authenticate client system 4 to the responding server system. When negotiating the security protocol and using the negotiated security protocol, authentication client module 304 may use HTTP client module 304 to send HTTP requests to and receive HTTP responses from the responding server system.

If HTTP client module 304 determines that the HTTP response is not an HTTP rejection response ("NO" of 604), HTTP client module 304 determines whether the HTTP response includes an authentication response header (608). AN HTTP response having a status code "200 Success" may include an authentication response header when an authentication process is completed successfully. If HTTP client module 304 determines that the HTTP response includes an authentication response header ("YES" of 608), HTTP client module 304 provides authentication data specified by the authentication response header to authentication client module 308 (610).

After providing the authentication data to authentication client module 308 or after determining that the HTTP response does not include an authentication response header ("NO" of 608), HTTP client module 304 extracts an HTTP authentication mode preference header from the HTTP response (612). As discussed above, the HTTP authentication mode preference header indicates a preferred HTTP authentication mode. For instance, the HTTP authentication mode preference header may indicate that the preferred HTTP authentication mode is connection-based HTTP authentication. Alternatively, the HTTP authentication mode preference header may indicate that the preferred HTTP authentication mode is request-based HTTP authentication.

After extracting the HTTP authentication mode preference header, HTTP client module 304 updates mode preference data (614). HTTP client module 304 updates the mode preference data to indicate that the preferred HTTP authentication mode for the responding server system is the HTTP authentication mode indicated by the HTTP authentication mode preference header. In one example implementation, client system 4 stores the mode preference data in mode preference data repository 310.

After updating the mode preference data, HTTP client module 304 extracts the requested resource from the HTTP response (616). For example, HTTP client module 304 may extract a requested Web page from the HTTP response. Once HTTP client module 304 has extracted the requested resource from the HTTP response, HTTP client module 304 provides the requested resource to the requesting application (618).

Figure 7:
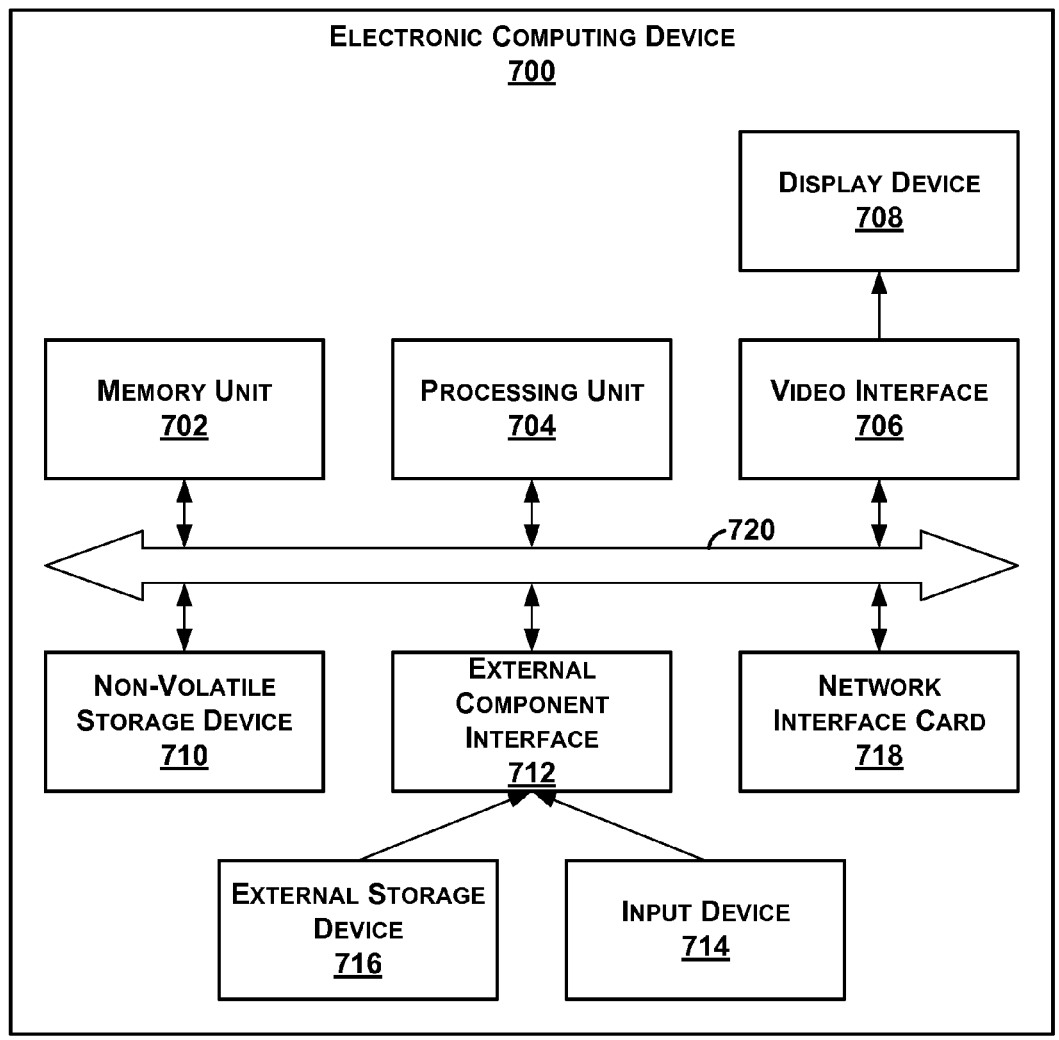
FIG. 7 is a block diagram illustrating example physical components of an electronic computing device.

FIG. 7 is a block diagram illustrating example physical components of an electronic computing device 700. As illustrated in the example of FIG. 7, electronic computing device 700 comprises a memory unit 702. Memory unit 702 is a computer-readable data storage medium capable of storing data and/or instructions. Memory unit 702 may be a variety of different types of computer-readable storage media including, but not limited to, dynamic random access memory (DRAM), double data rate synchronous dynamic random access memory (DDR SDRAM), reduced latency DRAM, DDR2 SDRAM, DDR3 SDRAM, Rambus RAM, or other types of computer-readable storage media.

In addition, electronic computing device 700 comprises a processing unit 704. As mentioned above, a processing unit is a set of one or more physical electronic integrated circuits that are capable of executing instructions. In a first example, processing unit 704 may execute software instructions that cause electronic computing device 700 to provide specific functionality. In this first example, processing unit 704 may be implemented as one or more processing cores and/or as one or more separate microprocessors. For instance, in this first example, processing unit 704 may be implemented as one or more Intel Core 2 microprocessors. Processing unit 704 may be capable of executing instructions in an instruction set, such as the x86 instruction set, the POWER instruction set, a RISC instruction set, the SPARC instruction set, the IA-64 instruction set, the MIPS instruction set, or another instruction set. In a second example, processing unit 704 may be implemented as an ASIC that provides specific functionality. In an third example, processing unit 704 may provide specific functionality by using an ASIC and by executing software instructions.

Electronic computing device 700 also comprises a video interface 706. Video interface 706 enables electronic computing device 700 to output video information to a display device 708. Display device 708 may be a variety of different types of display devices. For instance, display device 708 may be a cathode-ray tube display, an LCD display panel, a plasma screen display panel, a touch-sensitive display panel, a LED array, or another type of display device.

In addition, electronic computing device 700 includes a non-volatile storage device 710. Non-volatile storage device 710 is a computer-readable storage medium that is capable of storing data and/or instructions. Non-volatile storage device 710 may be a variety of different types of non-volatile storage devices. For example, non-volatile storage device 710 may be one or more hard disk drives, magnetic tape drives, CD-ROM drives, DVD-ROM drives, Blu-Ray disc drives, or other types of non-volatile storage devices.

Electronic computing device 700 also includes an external component interface 712 that enables electronic computing device 700 to communicate with external components. As illustrated in the example of FIG. 7, external component interface 712 enables electronic computing device 700 to communicate with an input device 714 and an external storage device 716. In one implementation of electronic computing device 700, external component interface 712 is a Universal Serial Bus (USB) interface. In other implementations of electronic computing device 700, electronic computing device 700 may include another type of interface that enables electronic computing device 700 to communicate with input devices and/or output devices. For instance, electronic computing device 700 may include a PS/2 interface. Input device 714 may be a variety of different types of devices including, but not limited to keyboards, mice, trackballs, stylus input devices, touch pads, touch-sensitive display screens, or other types of input devices. External storage device 716 may be a variety of different types of computer-readable storage media including magnetic tape, flash memory modules, magnetic disk drives, optical disc drives, and other computer-readable storage media.

In addition, electronic computing device 700 includes a network interface card 718 that enables electronic computing device 700 to send data to and receive data from an electronic communication network. Network interface card 718 may be a variety of different types of network interface. For example, network interface card 718 may be an Ethernet interface, a token-ring network interface, a fiber optic network interface, a wireless network interface (e.g., WiFi, WiMax, etc.), or another type of network interface.

Electronic computing device 700 also includes a communications medium 720. Communications medium 720 facilitates communication among the various components of electronic computing device 700. Communications medium 720 may comprise one or more different types of communications media including, but not limited to, a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computer System Interface (SCSI) interface, or another type of communications medium.

Electronic computing device 700 includes several computer-readable storage media (i.e., memory unit 702, non-volatile storage device 710, and external storage device 716). Together, these computer-readable storage media may constitute a single data storage system. As discussed above, a data storage system is a set of one or more computer-readable data storage mediums. This data storage system may store instructions executable by processing unit 704. Actions described in the above description may result from the execution of the instructions stored on this data storage system. Thus, when this description says that a particular logical module performs a particular action, such a statement may be interpreted to mean that instructions of the logical module, when executed by processing unit 704, cause electronic computing device 700 to perform the action.

The technologies of this disclosure may be realized in many ways. For example, the technologies of this disclosure may be realized as a method of negotiating an HTTP authentication mode. The method comprises receiving a first HTTP request at a server system, the first HTTP request being sent by a client system, the first HTTP request requesting a first resource, the server system receiving the first HTTP request via an electronic communication network. In addition, the method comprises in response to receiving the first HTTP request, sending an HTTP response, the HTTP response being sent to the client system, the HTTP response being sent by the server system, the HTTP response containing an HTTP authentication mode preference header, the HTTP authentication mode preference header indicating a preferred HTTP authentication mode.

In another example, the technologies of this disclosure may be realized as an electronic computing device comprising a processing unit and a data storage system. The data storage system storing instructions that, when executed by the processing unit, cause the electronic computing system to receive a Hypertext Transfer Protocol (HTTP) response, the HTTP response being sent by a server system, the HTTP response being received by the electronic computing system via an electronic communication network, the HTTP response containing an HTTP authentication mode preference header, the HTTP authentication mode preference header indicating a preferred HTTP authentication mode. The instructions also cause the electronic computing system to, in response to receiving the HTTP response, update mode preference data such that the mode preference data indicates the preferred HTTP authentication mode. After updating the mode preference data, the instructions cause the electronic computing system to use the mode preference data to identify the preferred HTTP authentication mode. In response to identifying the preferred HTTP authentication mode, the instructions cause the electronic computing system to use the preferred HTTP authentication mode in an HTTP request, the HTTP request requesting a resource, the resource being provided by the server system, the HTTP request being sent via the electronic communication network, the HTTP request being sent to the server system.

In another example, the technologies of this disclosure may be realized as a computer-readable data storage medium storing instructions that, when executed by a processing unit of a server system, cause the server system to receive a Hypertext Transfer Protocol (HTTP) request, the HTTP request being received via an electronic communication network, the HTTP request being sent by a client system, the HTTP request requesting a resource, the resource being provided by the server system. In response to receiving the HTTP request, the instructions cause the server system to determine whether HTTP authentication is required to access the resource. In response to determining that HTTP authentication is not required to access the resource, the instructions cause the server system to retrieve the resource. In response to determining that HTTP authentication is not required to access the resource, the instructions cause the server system to send a first HTTP response, the first HTTP response containing the resource, the first HTTP response being sent via the electronic communication network, the first HTTP response being sent to the client system. In response to determining that HTTP authentication is required to access the resource, the instructions cause the server system to identify a required HTTP authentication mode, the required HTTP authentication mode being an HTTP authentication mode required to access the resource. In response to identifying the required HTTP authentication mode, the instructions cause the server system to determine whether the required HTTP authentication mode is connection-based HTTP authentication. The instructions also cause the server system to send a second HTTP response, the server system sending the second HTTP response when the second HTTP authentication mode is connection-based HTTP authentication, the second HTTP response being responsive to the HTTP request, the second HTTP response containing a first HTTP authentication mode preference header, the first HTTP authentication mode preference header indicating that a preferred HTTP authentication mode is connection-based HTTP authentication, the second HTTP response being sent via the electronic communication network, the second HTTP response being sent to the client system. In response to identifying the required HTTP authentication mode, the instructions cause the server system to determine whether the required HTTP authentication mode is request-based HTTP authentication. Furthermore, the instructions cause the server system to send a third HTTP response, the server system sending the third HTTP response when the required HTTP authentication mode is request-based HTTP authentication, the third HTTP response being responsive to the HTTP request, the third HTTP response containing a second HTTP authentication mode preference header, the second HTTP authentication preference header indicating that the preferred HTTP authentication mode is request-based HTTP authentication, the third HTTP response being sent via the electronic communication network, the third HTTP response being sent to the client system.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method of negotiating a Hypertext Transfer Protocol (HTTP) authentication mode, the method comprising:
   receiving from a client system a first HTTP request at a server system, the first HTTP request requesting a first resource, wherein the server system receives the first HTTP request via an electronic communication network;
   determining, at the server system, a first authentication mode;
   when the first authentication mode is a connection-based HTTP authentication, performing steps comprising:
      determining, at the server system, whether the first HTTP request includes an authorization header;
      when the first HTTP request includes the authorization header, determining, at the server system, whether an authentication process is successful;
   in response to determining the authentication process is successful, sending an HTTP response from the server system to the client system, the HTTP response containing an HTTP authentication mode preference header, wherein the HTTP authentication mode preference header indicates the connection-based HTTP authentication is a preferred HTTP authentication mode.

2. The method of claim 1, wherein using the authorization header to perform the authentication process comprises using, by the server system, a Kerberos security protocol to perform the authentication process.

3. The method of claim 1, wherein using the authorization header to perform the authentication process comprises using, by the server system, a negotiation mechanism to negotiate a security protocol used in the authentication process.

4. The method of claim 1, wherein the connection is a Transmission Control Protocol (TCP) connection.

5. The method of claim 1, the method further comprising: receiving a second HTTP request at the server system, the server system receiving the second HTTP request after the server system sends the HTTP response, the second HTTP request being sent by the client system, the second HTTP request requesting a second resource, the server system receiving the second HTTP request via the electronic communication network, the second HTTP request containing an authorization header when the HTTP authentication mode preference header indicated that the preferred HTTP authentication mode is request-based HTTP authentication, the second HTTP request not containing an authorization header when the HTTP authentication mode preference header indicated that the preferred HTTP authentication mode is connection-based HTTP authentication.

6. The method of claim 1, wherein the HTTP authentication mode preference header uses a Boolean value to indicate the preferred HTTP authentication mode.

7. An electronic computing system comprising:
   a processing unit; and
   a data storage system, the data storage system storing instructions that, when executed by the processing unit, cause the electronic computing system to:
      receive a Hypertext Transfer Protocol (HTTP) response, the HTTP response being sent by a server system, the HTTP response being received by the electronic computing system via an electronic communication network, the HTTP response containing an HTTP authentication mode preference header, the HTTP authentication mode preference header indicating a preferred HTTP authentication mode;
      in response to identifying the preferred HTTP authentication mode, use the preferred HTTP authentication mode in an HTTP request, the HTTP request requesting a resource, the resource being provided by the server system, the HTTP request being sent via the electronic communication network, the HTTP request being sent to the server system; and
      in response to using the preferred HTTP authentication mode in the HTTP request, receive a second HTTP response, wherein the second HTTP response contains as second authentication mode preference header comprising a Persistent-Auth field, wherein the Persistent-Auth field indicates whether subsequent requests will require an authorization header.

8. The electronic computing system of claim 7,
   wherein the instructions further cause the electronic computing system to:
      in response to identifying the preferred HTTP authentication mode, determine whether the preferred HTTP authentication mode is connection-based HTTP authentication; and
      in response to determining that the preferred HTTP authentication mode is connection-based HTTP authentication, determine whether a connection exists between the electronic computing system and the server system;
   wherein the instructions cause the electronic computing system to use the preferred HTTP authentication mode by causing the electronic computing system to:
      in response to determining that a connection exists between the electronic computing system and the server system, generate the HTTP request, the HTTP request not including an authorization header; and
      send the HTTP request to the server system.

9. The electronic computing system of claim 8, wherein the connection is a Transmission Control Protocol (TCP) connection.

10. The electronic computing system of claim 8, wherein the instructions cause the electronic computing system to use the preferred HTTP authentication mode by further causing the electronic computing system to:
generate the authorization header, the instructions causing the electronic computing system to generate the authorization header in response to determining that a connection does not exist between the electronic computing system and the server system;
generate the HTTP request, the instructions causing the electronic computing system to generate the HTTP request in response to determining that a connection does not exist between the electronic computing system and the server system, the HTTP request including the authorization header; and
send the HTTP request to the server system.

11. The electronic computing system of claim 10, wherein the authorization header includes a client-to-server ticket and an authenticator for use in a Kerberos security protocol.

12. The electronic computing system of claim 7,
wherein the instructions further cause the electronic computing system to: in response to identifying the preferred HTTP authentication mode, determine whether the preferred HTTP authentication mode is request-based HTTP authentication; and
wherein using the preferred HTTP authentication mode comprises:
in response to determining that the preferred HTTP authentication mode is request-based HTTP authentication, generate the HTTP request, the HTTP request including the authorization header; and
send the HTTP request to the server system.

13. The electronic computing system of claim 7,
wherein the instructions further cause the electronic computing system to:
in response to receiving the HTTP response, update mode preference data such that the mode preference data indicates the preferred HTTP authentication mode;
after updating the mode preference data, use the mode preference data to identify the preferred HTTP authentication mode;
determine whether the mode preference data indicates the preferred HTTP authentication mode;
wherein the instructions cause the electronic computing system to use the mode preference data to identify the preferred HTTP authentication mode in response to determining that the mode preference data indicates the preferred HTTP authentication mode; and
wherein the instructions further cause the electronic computing system to generate a second HTTP request, the instructions causing the electronic computing system to generate the second HTTP request in response to determining that the mode preference data does not indicate the preferred HTTP authentication mode, the second HTTP request requesting the resource, the second HTTP request being sent via the electronic communication network, the second HTTP request being sent to the server system.

14. The electronic computing system of claim 13, wherein the mode preference data is stored at the electronic computing system.

15. The electronic computing system of claim 7, wherein the HTTP authentication mode preference header uses a Boolean value to indicate the preferred HTTP authentication mode.

16. The electronic computing system of claim 7, the instructions causing the electronic computing system to generate the HTTP request in response to a resource request, the resource request being sent by an application, the application operating at the electronic computing system.

17. A computer-readable data storage medium not consisting of a propagated data signal, the computer-readable data storage medium comprising instructions that, when executed by a processing unit of a server system, cause the server system to:
receive a Hypertext Transfer Protocol (HTTP) request, the HTTP request being received via an electronic communication network, the HTTP request being sent by a client system, the HTTP request requesting a resource, the resource being provided by the server system;
in response to receiving the HTTP request, determine whether HTTP authentication is required to access the resource;
in response to determining that HTTP authentication is not required to access the resource, retrieve the resource;
in response to determining that HTTP authentication is not required to access the resource, send a first HTTP response, the first HTTP response containing the resource, the first HTTP response being sent via the electronic communication network, the first HTTP response being sent to the client system;
in response to determining that HTTP authentication is required to access the resource, identify a required HTTP authentication mode, the required HTTP authentication mode being an HTTP authentication mode required to access the resource;
in response to identifying the required HTTP authentication mode, determine whether the required HTTP authentication mode is connection-based HTTP authentication;
send a second HTTP response, the server system sending the second HTTP response when the second HTTP authentication mode is connection-based HTTP authentication, the second HTTP response being responsive to the HTTP request, the second HTTP response containing a first HTTP authentication mode preference header, the first HTTP authentication mode preference header indicating that a preferred HTTP authentication mode is connection-based HTTP authentication, the second HTTP response being sent via the electronic communication network, the second HTTP response being sent to the client system;
in response to identifying the required HTTP authentication mode, determine whether the required HTTP authentication mode is request-based HTTP authentication; and
send a third HTTP response, the server system sending the third HTTP response when the required HTTP authentication mode is request-based HTTP authentication, the third HTTP response being responsive to the HTTP request, the third HTTP response containing a second HTTP authentication mode preference header, the second HTTP authentication preference header indicating that the preferred HTTP authentication mode is request-based HTTP authentication, the third HTTP response being sent via the electronic communication network, the third HTTP response being sent to the client system.

* * * * *